(No Model.) 3 Sheets—Sheet 1.
A. STARK.
GRAIN BINDER.
No. 520,458. Patented May 29, 1894.
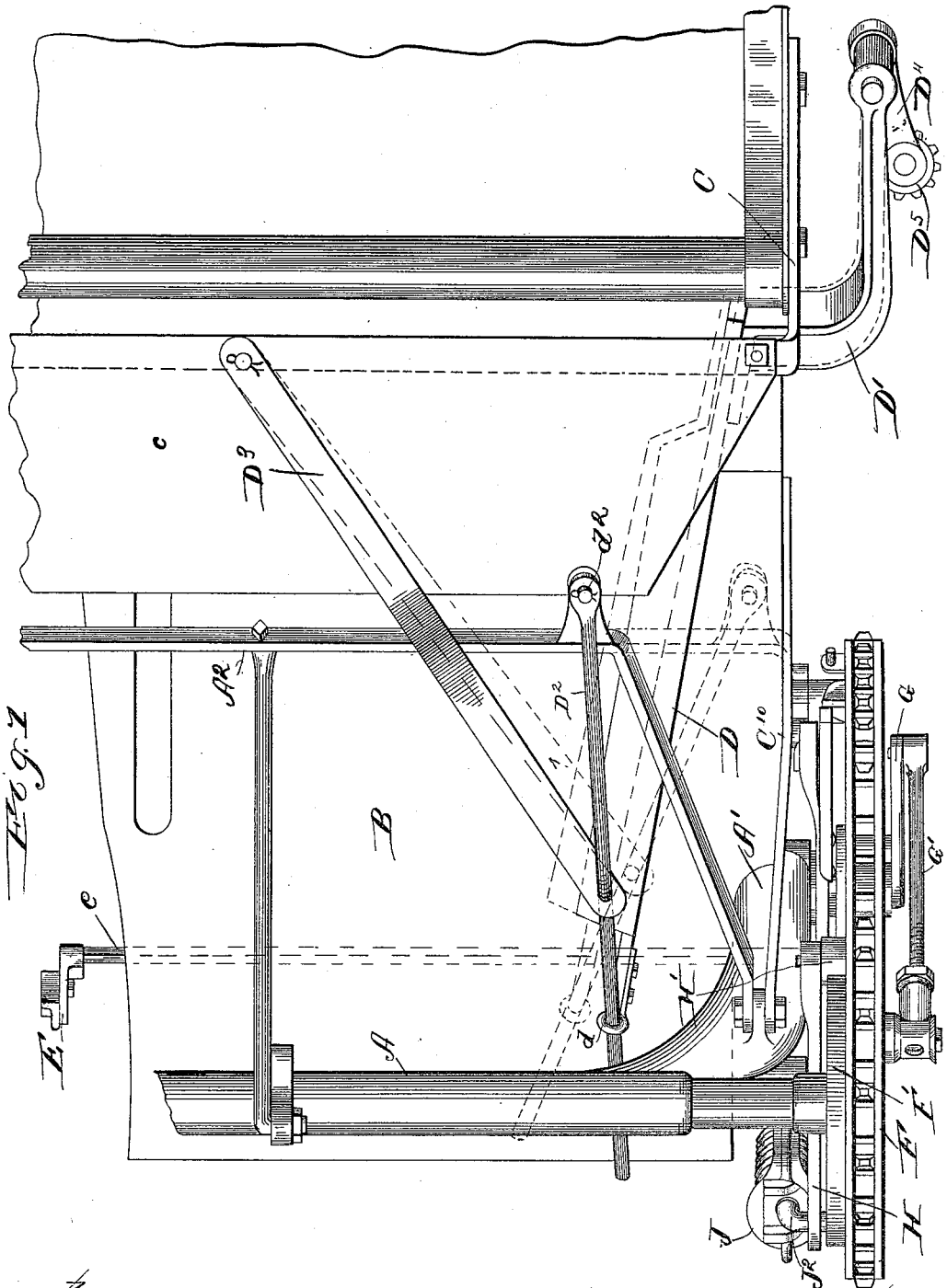
Witnesses:
Jean Elliott
E. T. Wray.
Inventor:
Andrew Stark
By Burton & Burton his Attys.

(No Model.) 3 Sheets—Sheet 2.
A. STARK.
GRAIN BINDER.
No. 520,458. Patented May 29, 1894.
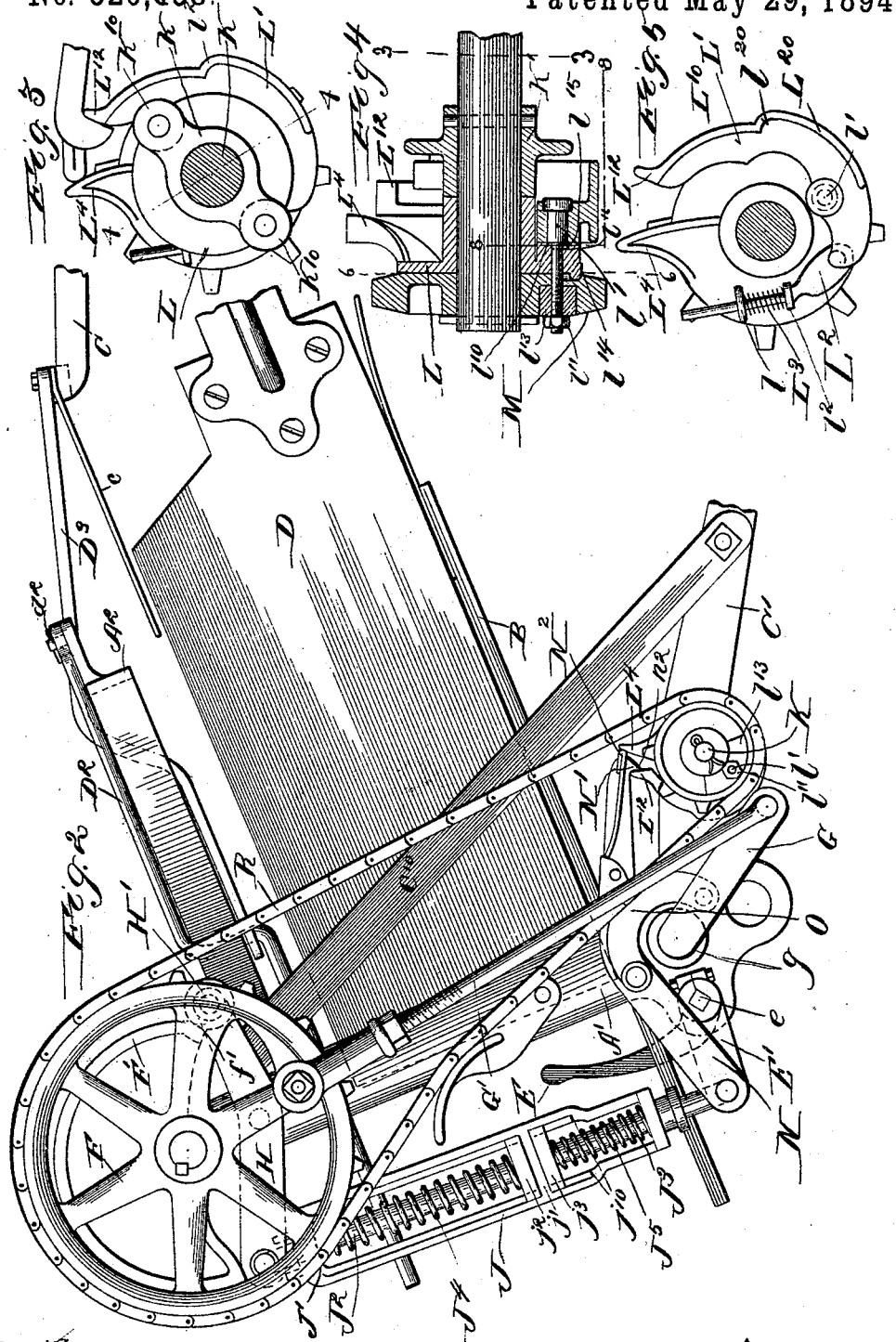

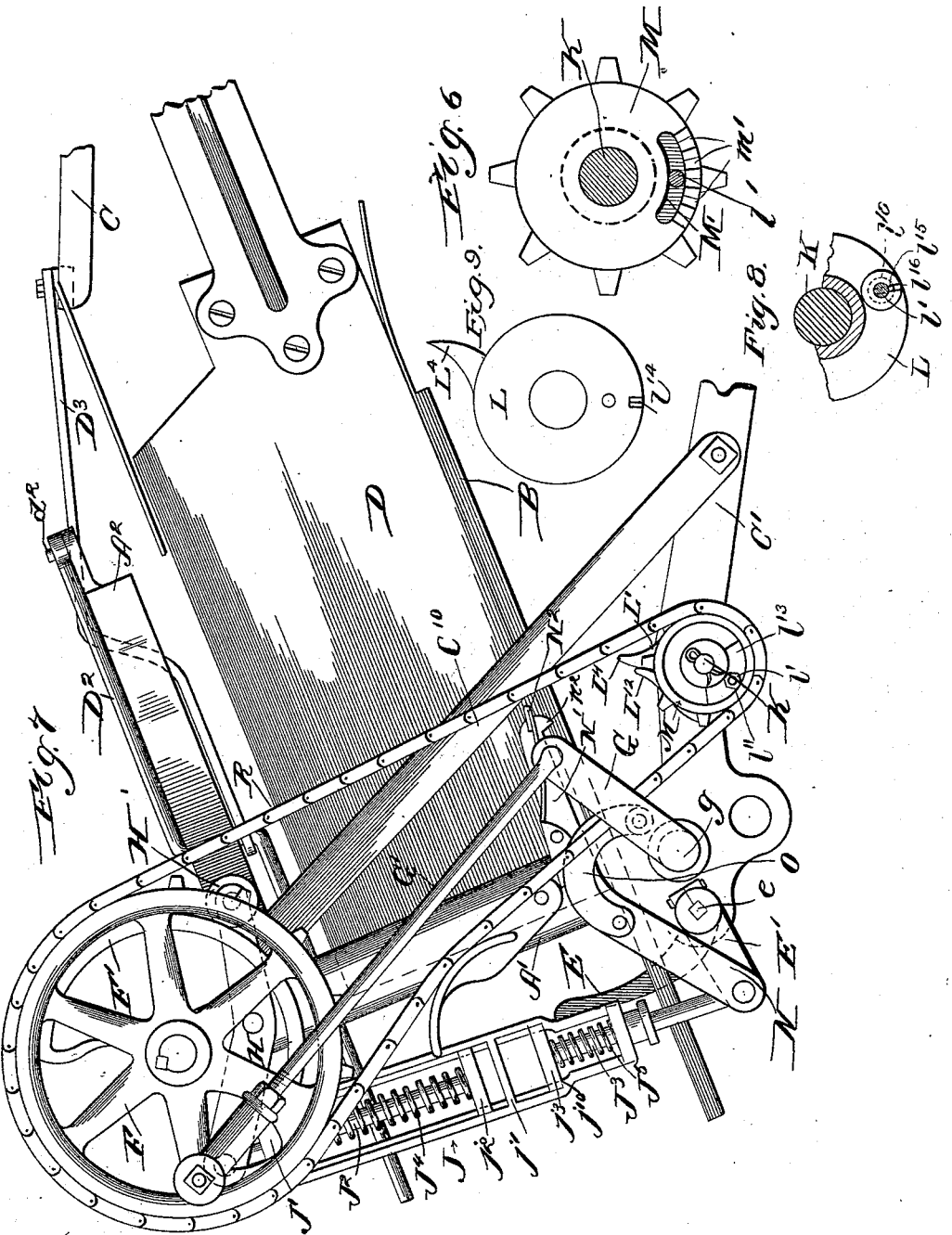

UNITED STATES PATENT OFFICE.

ANDREW STARK, OF CHICAGO, ILLINOIS, ASSIGNOR OF ONE-HALF TO THE WARDER, BUSHNELL & GLESSNER COMPANY, OF SPRINGFIELD, OHIO.

GRAIN-BINDER.

SPECIFICATION forming part of Letters Patent No. 520,458, dated May 29, 1894.

Application filed October 27, 1892. Serial No. 450,110. (No model.)

*To all whom it may concern:*

Be it known that I, ANDREW STARK, a citizen of the United States, residing at Chicago, county of Cook, and State of Illinois, have invented certain new and useful Improvements in Grain-Binders, which are fully set forth in the following specification, reference being had to the accompanying drawings, forming a part thereof.

In the drawings,—Figure 1 is a detail plan of a portion of a grain binder containing my invention. Fig. 2 is a front elevation of the same mechanism. Fig. 3 is a forward side elevation of the clutch, the shaft being shown in section at the line 3—3 on Fig. 4, the position of the parts being that of rest, and the clutch being shown disengaged, and the trip hook which holds it thus disengaged being also shown. Fig. 4 is a section at the line 4—4 on Fig. 3, a bolt and a shaft which are cut diametrically being shown in elevation. Fig. 5 is a view similar to Fig. 3, with the revolving clutch dog removed from the shaft. Fig. 6 is a section at the line 6—6 on Fig. 4. Fig. 7 is an elevation of the mechanism shown in Fig. 2, the position of the parts being that occupied at a certain stage of the binding operation. Fig. 8 is a section at the line 8—8 on Fig. 4. Fig. 9 is an elevation of a disk in the clutching mechanism.

I have shown my improvements as applied to a front geared binder.

A is the binder frame in the customary U-form.

B represents the deck.

$c$ is the elevator hood or over-deck.

C is a portion of the harvester frame to which attachment may be made, and which extends from front to rear above the elevator at its discharge side.

It will be understood that the binder is supported on the harvester frame in any customary manner not specifically shown.

C' is an arm which extends from the lower part of the binder gear standard and is braced by an arm $C^{10}$, which extends to the upper part of the same, said arm being designed to brace or support the binder on the harvester in a manner which will be well understood.

In the drawings there are shown portions of mechanism relating to the butting devices which form no part of the invention to which this application relates, the same being included in an application filed as a division hereof, serially numbered 467,792, filed March 27, 1893. These parts may be mentioned to distinguish them from the matter of this invention. They comprise the butting board D, with its arm D'; the crank $D^4$ on the pinion $D^5$; the link $D^2$, pivoted at $d^2$ on the bar $A^2$ of the binder frame; a controlling link $D^3$ pivoted on the bar C of the harvester frame, and pivotally connected to the link $D^2$, which latter is connected at the eye $d$ to the butting board D.

This invention relates to the tripping, compressing and clutching devices of a grain binder.

E is a trip and compress arm.

$e$ is its shaft, which is suitably journaled in the binder frame underneath the deck, and extends forward from the arm E to its foremost bearing which is obtained on the binder frame A forward of and near the vertical plane of the upright standard A' of that frame.

E' is a crank or lever arm at the forward end of this shaft, whose hub constitutes the immediate bearing of the shaft in the binder frame A.

F is the binder driving cam wheel, which sustains the usual relation to the needle rock shaft $g$, whose crank arm G is actuated by the customary pitman G' connected to said wheel F.

H is a lever fulcrumed on the standard A' of the binder frame below the bearing of the shaft of the wheel F, having at one end the roll H', which is actuated by the cam track F' on the wheel F, the other end of said lever being connected by the extensible link J to the trip-and-compress-lever-arm E'. The construction of this extensible link is peculiar, in that it comprises three parts besides the co-operating springs,—the yoke J', the rod $J^2$ which protrudes from the upper end of the yoke and connects with the lever H, and the rod $J^3$ which protrudes from the lower end of the yoke and connects with the trip-and-compress lever E'. The rods $J^2$ and $J^3$ are provided with head blocks $j^2$ and $j^3$ respectively, which are suitably guided in the yoke J', and stopped against the cross-bar $j'$, the block $j^3$ being also stopped at the other limit of its movement by the shoulder $j^{10}$ on the link side-bars.

$J^4$ is the compress spring and $J^5$ the trip spring, said springs being coiled respectively about the rods $J^2$ and $J^3$, and stopped between the ends respectively of the yoke $J'$ and the head blocks $j^2$ and $j^3$.

K is the binder driving shaft; that is to say, the shaft through which power is communicated from the continuously operating harvester train to the binder train, said shaft having continuous rotary motion.

$K'$ is a clutch dog fixed on the shaft K and partaking of its continuous rotary motion, and having, at opposite ends, the clutch-engaging abutments $K^{10} K^{10}$. The clutch comprises the disk L and the latch $L'$, pivoted to the disk on the stud $l'$, and having the link $L^2$ extending from its heel through the lug $l$ on the disk L, and provided with the compressible spring $L^3$ interposed between the lug and the shoulder $l^2$ on the link, whereby the spring tends to force the heel of the latch $L'$ away from the center of the shaft K, and thereby throw the opposite arm of the latch in toward the shaft. The latch $L'$ has a flange, comprising two portions $L^{10}$ and $L^{20}$, the former being in an arc about the center of the shaft when the latch is rocked in toward the shaft until its web rests upon the hub of the disk L, and the latter extending in an arc about the same center when the latch is forced away from the hub to the limit permitted by the construction, as hereinafter explained. A shoulder is formed where these two portions of the flange unite, which constitutes a seat $l^{20}$ for the abutments $K^{10}$ of the revolving dog $K'$, whereby, when said abutments are thus seated, the dog carries the clutch with it in its rotary motion.

For a purpose which will be hereinafter more fully explained, the binder driving sprocket pinion M is detachably but rigidly secured to the clutch disk L, so that the rotation of the said disk rotates the sprocket pinion and thereby drives the binder mechanism. The entire clutch and sprocket pinion are retained on the shaft K by a cotter pin inserted through the latter outside the sprocket pinion. The disk L has a projecting nose $L^4$, and the latch $L'$ has a nose $L^{12}$. When the parts are assembled in operative relation, the nose $L^{12}$ rotates in a plane rearward of the plane of rotation of the nose $L^4$, as seen in Fig. 4.

N is a lever connected to the end of the lever arm $E'$ of the trip and compress shaft, said connection being conveniently made at the same point at which the rod $J^3$ of the trip and compress link is connected to the lever arm $E'$, the horizontally bent end of that rod serving as the pivotal connection for both purposes. The entire lever N has its fulcrum on one end of the link O, which is in the form of a half ring about the bearing of the needle-rock-shaft, the other end of the link being pivotally connected to the crank arm G of the needle rock shaft. In the position of rest of the parts, the link O and the lever N are mutually fixed with respect to the binder frame and with respect to the needle rock shaft, by reason of the pivoting of the lower end of the link on the needle crank arm, which is then stationary, and the pivoting of one end of the lever upon the crank arm $E'$, which is also then stationary, and the pivoting of the link to the lever, as stated. The end of this lever opposite that at which it is connected to the rod $J^3$ and the crank arm $E'$, is made in the form of a hook $N'$, and is located in the vertical plane of rotation of the nose $L^{12}$ of the latch $L'$.

To the lever N, there is secured a spring finger $N^2$, which extends alongside the arm $N'$ of said lever in front of the latter, and is located therefore in the plane of rotation of the nose $L^4$ of the clutch disk L. The shoulder $n^2$ of the hook arm N is distant from the end of the spring far enough so that while the nose $L^{12}$ is engaged by the shoulder, and the nose $L^4$ is engaged by the end of the spring, the clutch latch $L'$ is forced away from the shaft K far enough to bring the flange $L^{10}$ outside the track of the abutments $K^{10}$ of the revolving dog $K'$, and when this is the position of the parts, therefore, the clutch dog is disengaged from the clutch and the binder is at rest. Any action that lifts the lever arm $N'$ of the lever N out of engagement with the nose $L^{12}$ will permit the latch $L'$ to be thrown in by the action of the spring $L^3$, so that the shoulder $l^{20}$ will stand in the path of rotation of the abutments $K^{10}$, the flange $L^{20}$ being then the boundary of said path, and the abutments will therefore engage the latch $L'$ at that shoulder $l^{20}$, and the dog will thereby rotate the clutch and sprocket pinion and operate the binder mechanism. This result is brought about by the pressure of the grain against the trip-and-compress arm E, forcing said arm stubbleward and rocking its shaft and throwing downward the lever arm $E'$, compressing first the trip spring $J^5$, whose tension will be adjusted according to the degree of compactness and size of bundle desired. The rocking of the crank arm downward against the resistance of the spring carries downward the stubbleward end of the lever N, and lifts the grainward hooked end $N'$, releasing the nose $L^{12}$ of the latch $L'$, and permitting the engagement above described between said latch and clutch dog. The binder train being thus brought into action, the rotation of the wheel F causes its cam $F'$ upon the lever H to pull upward the trip and compress link with a tendency to rock the trip and compress arm E grainward toward the binder, compressing meanwhile the compressor spring $J^4$. This movement of the compress arm, its rock shaft and the lever arm $E'$, would tend to rock the lever N so as to throw its hooked arm $E'$ down again into the path of rotation of the nose $L^{12}$, but the same movement of the parts which has thus rocked the compress rock shaft and tilted its lever arm E' upward, has carried the needle rock shaft crank G upward, and that, in turn, has lifted the link O, and with it, the fulcrum of the lever N, so that that lever, instead of being thrown downward, is elevated to the position shown in Fig. 7 entirely out of the path of the clutch mechanism. When the binding operation is nearing its close and the needle rock shaft crank arm G is swinging downward again toward its position of rest, the cam F' on the wheel F is revolving toward the position at which the recess $f'$ in the cam track will receive the abutment of the cam roll H' of the lever H. The purpose of this seat is to cause the cam roll, when it lodges therein, to lock the wheel and thereby the binder mechanism as a whole against reverse action. It is evident that this relation of the parts,—that is, the seating of the roll in the seat, should occur substantially at the same instant at which the clutch latch $L^{12}$ is disengaged from the abutment $K^{10}$ of the revolving dog K', since, as soon as this disengagement is effected, the movement of the binder mechanism may independently cease, any movement which would occur after that being due simply to the momentum of the parts, and being, therefore, entirely uncertain and not to be relied upon to bring the wheel F to locking position. The disengagement of the clutch latch being effected by the engagement of the hooked end N' with the nose of the latch, the point at which such disengagement will occur in the rotation of the clutch disk can be fixed with precision, but the connection between the sprocket pinion M and the sprocket wheel F, being made by a draft chain, the variations unavoidable in the construction of the frame, sprocket wheels and chain as well as the wear in the many pivots of the latter, render it unsafe to rely upon the precise relation existing between the position of the sprocket wheel and the clutch disk at one limit of the course of the chain, and the sprocket wheel F at the other limit. In order, therefore, both to make it possible to adjust each machine to the particular chain placed upon it when the machine is first assembled, and also to correct the adjustment to compensate for the wear of the chain and on the sprockets, from time to time, in order to produce the action above described as desirable, I make the sprocket rim separate from the clutch disk, and secure the two parts together rigidly but adjustably by means of the bolt $l'$, which serves as the pivot of the latch L' to the disk L, said bolt extending to the disk into which it is driven up to the shoulder $l^{10}$, and thence through the segmental slot M' in the sprocket pinion M, and being retained by a nut $l^{11}$ a segmental washer $l^{13}$ being provided, extending over the segmental slot M', and enabling the nut thus to bind the sprocket wheel to the disk at any position to which it may be adjusted within the range of the slot M'. In order that reliance need not be placed solely upon the friction of the two parts thus bound, I prefer to provide the face of the sprocket rim at the margin of the slot M' with serrations $m'$, and on the face of the disk I make a single tooth $l^{14}$ adapted to engage these serrations, whereby substantially positive engagement is made between the two parts when the nut is drawn tight. In order to prevent the bolt from turning when the bolt is screwed up, and so making it difficult to draw the latter tight, inasmuch as the head is at that time inaccessible so that it cannot be held, I insert through the bolt below the shoulder $l^{10}$, a pin $l^{15}$, which protrudes at one end to the height of the shoulder, and I make, in the face of the boss on the disk on which said shoulder binds, a notch $l^{16}$ to receive this projection.

It should be observed that during the binding operation the grainward ply of said drive chain R is the taut side, the slack being thrown upon the stubbleward ply, and that, when the hooked end N' of the lever N engages the nose $L^{12}$ of the latch L' and disengages the latch from the driving dog K', the reaction from the tension to which the grainward ply of the chain has been subjected during work will tend to equalize the slack upon the two sides, so that if the parts were constructed to effect the disengagement of the latch from the dog at the precise instant at which the abutment roll H' becomes lodged in the seat $f'$ of the cam track, such reaction will tend to rotate the sprocket pinion and clutch disk back a little distance and thereby permit the spring $L^3$ to operate upon the latch L' and throw it inward exposing it to the liability of being engaged again by the clutch dog. To prevent this, the spring finger $N^2$ is provided on the lever N', and so proportioned that after the hook arm L' has engaged the latch $L^{12}$, and the latter has been partly withdrawn from engagement with the abutment of the clutch dog, the end of the spring $N^2$ will slip down behind the nose $L^4$, and hold the two noses $L^{12}$ and $L^4$ apart, the spring sliding down on the face of the nose $L^4$ as fast and as far as the further withdrawal of the nose $L^{12}$ permits, thereby retaining all the separation between the noses which is produced, so that when the movement has progressed far enough to effect complete disengagement of the latch L' from the clutch dog, and stop the driving action of the dog upon the disk, not only will the momentum of the disk be checked by the engagement of the nose $L^{12}$ with the hook of the arm N', but in so far as that momentum might carry the disk farther, such action will be accompanied by the action of the spring $N^2$, following on down the inclined face of the nose $L^4$, and preventing any return or recoil. The web of the latch L' at the heel is extended beyond its pivot to the point where the link $L^2$ is connected to it, so that by its collision with the hub of the disk L, it constitutes a stop to limit the disengaging movement of the latch, and if the momentum of the wheel F and connected parts of the binder mechanism should tend to carry the sprocket wheel and disk beyond the proper point for locking the mechanism at rest, such tendency will be overcome and the motion arrested positively when the said heel of the latch collides with the hub of the disk.

I claim—

1. In a grain binder, in combination with the trip and compress lever, the rock shaft lever arm and extensible link connections therefrom to the cam lever H; the clutch comprising the pivoted latch L', the link O having one pivot fixed with respect to the needle rock shaft and accompanying the latter in its rocking movement; the lever N fulcrumed on said link at a point remote from the said pivot of the latter, having one end adapted to engage the clutch latch and pivotally connected at the other end to the trip-and-compress lever arm: substantially as set forth.

2. In combination with the clutch comprising the latch L', the lever N adapted to engage said latch to disengage it from the clutch dog; the link O pivoted to the needle-rock-shaft crank arm and extending part way around the bearing of said rock shaft, and affording a fulcrum for the lever N at the opposite side of said bearing from the link's pivot; the trip rock shaft and its lever arm E' which actuates the lever N: substantially as set forth.

3. In combination with the revolving clutch dog and the clutch disk, having the nose $L^4$ and the spring-actuated clutch latch pivoted to said disk and having the shoulder or seat $l^{20}$ for the clutch dog; the lever N, adapted to engage the nose of the latch as the clutch revolves and disengages it from the dog, and having the spring finger $N^2$ adapted to spring down behind said nose $L^4$, and follow the face of the latter as the latch is withdrawn from the clutch dog; whereby the nose is held at the farthest point from the nose $L^4$ to which it is removed in the process of disengaging the latch from the dog: substantially as set forth.

4. In combination with the binder driving cam wheel F, the clutch comprising the revolving dog and the disk, and the clutch latch by which they are engaged; the sprocket pinion M, and the chain by which it drives the wheel F, said sprocket pinion being adjustably secured to the clutch disk concentric therewith: substantially as and for the purpose set forth.

5. In combination, substantially as set forth, the clutch comprising the disk, and the latch by which it is engaged with the clutch dog; the pinion M on the same shaft with the clutch disk; a bolt on which the pinion is secured to the disk, the pinion having a segmental slot for said bolt and a segmental washer to cover the slot.

6. In combination, substantially as set forth, the clutch comprising the clutch disk L; the clutch latch L'; a shouldered bolt by which the latch is pivoted to the disk; the sprocket wheel M on the same shaft with the disk having a segmental slot in its web, said bolt being extended through said slot and provided with a segmental washer at the outer side: substantially as set forth.

7. In combination with the clutch disk, the sprocket pinion M on the same shaft having a segmental slot in its web; a bolt extending through said slot and securing the pinion to the disk, the face of one of the two parts which are thus secured together being serrated, and the other having a tooth to engage such serrations at the margin of the segmental slot: substantially as set forth.

In testimony whereof I have hereunto set my hand, in the presence of two witnesses, at Chicago, Illinois, this 12th day of October, 1892.

ANDREW STARK.

Witnesses:
CHAS. S. BURTON,
JEAN ELLIOTT.